(12) United States Patent
    Villeneuve

(10) Patent No.: US 10,328,648 B2
(45) Date of Patent: Jun. 25, 2019

(54) TEXTURED DIE HAVING BLOCKS FOR MANUFACTURING A TEXTURED MOULD FOR MOULDING AND VULCANIZING TIRES

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventor: Bernard Villeneuve, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 90 days.

(21) Appl. No.: 15/329,670

(22) PCT Filed: Jul. 21, 2015

(86) PCT No.: PCT/IB2015/001213
    § 371 (c)(1),
    (2) Date: Jan. 27, 2017

(87) PCT Pub. No.: WO2016/016699
    PCT Pub. Date: Feb. 4, 2016

(65) Prior Publication Data
    US 2017/0225419 A1    Aug. 10, 2017

(30) Foreign Application Priority Data
    Jul. 30, 2014    (FR) .................................... 14 01753

(51) Int. Cl.
    *B29D 30/06*    (2006.01)
    *B29C 33/38*    (2006.01)
    (Continued)

(52) U.S. Cl.
    CPC ...... *B29D 30/0606* (2013.01); *B29C 33/3842* (2013.01); *B22C 7/00* (2013.01);
    (Continued)

(58) Field of Classification Search
    CPC ............ B29C 33/3842; B29C 33/3857; B29C 33/3878; B29C 33/3892; B29C 33/424;
    (Continued)

(56) References Cited

U.S. PATENT DOCUMENTS 2,263,001 A    11/1941    Gunsaulus et al.
2,268,344 A *  12/1941    Shesterkin .......... B60C 11/0309
                                                      152/209.18
(Continued)

FOREIGN PATENT DOCUMENTS

WO    WO 95/18022    *   7/1995
WO    WO 99/48674        9/1999
(Continued)

*Primary Examiner* — James P Mackey
(74) *Attorney, Agent, or Firm* — Cozen O'Connor

(57) ABSTRACT

Die (1) representing a tread pattern model for a tread of a tire to be molded. The die is made up of a plurality of blocks (2) separated by grooves (4), at least a part of the die having surfaces provided with textures (5).

13 Claims, 3 Drawing Sheets

(51) Int. Cl.
 *B22C 7/00* (2006.01)
 *B29C 33/42* (2006.01)

(52) U.S. Cl.
 CPC ...... *B29C 33/3878* (2013.01); *B29C 33/3892* (2013.01); *B29C 33/424* (2013.01); *B29D 2030/0612* (2013.01); *B29D 2030/0616* (2013.01)

(58) Field of Classification Search
 CPC .. B22C 7/00; B22C 9/06; B22C 13/00; B29D 30/0606; B29D 2030/0612; B29D 2030/0616
 See application file for complete search history.

(56) References Cited

U.S. PATENT DOCUMENTS

| | | | | |
|---|---|---|---|---|
| 2,983,699 | A * | 5/1961 | Reid | B29C 33/3857 260/998.18 |
| 6,112,788 | A * | 9/2000 | Ikeda | B60C 11/0309 152/209.19 |
| 6,505,661 | B1 * | 1/2003 | Nakagawa | B60C 11/0302 152/209.15 |
| 6,551,086 | B1 * | 4/2003 | Tuttle | B29C 33/0033 264/219 |
| 7,402,031 | B2 * | 7/2008 | Hyakutake | B22C 9/02 425/28.1 |
| 9,238,309 | B2 * | 1/2016 | King | B29C 33/3857 |
| 9,346,229 | B2 * | 5/2016 | Cocural | B29D 30/0606 |
| 2002/0176792 | A1 | 11/2002 | Tuttle et al. | |
| 2003/0111150 | A1 | 6/2003 | Zimmer et al. | |
| 2013/0112326 | A1 * | 5/2013 | Mellara | B60C 11/13 152/209.19 |

FOREIGN PATENT DOCUMENTS

| | | |
|---|---|---|
| WO | WO 2010/072961 | 7/2010 |
| WO | WO 2010/096072 | 8/2010 |

\* cited by examiner

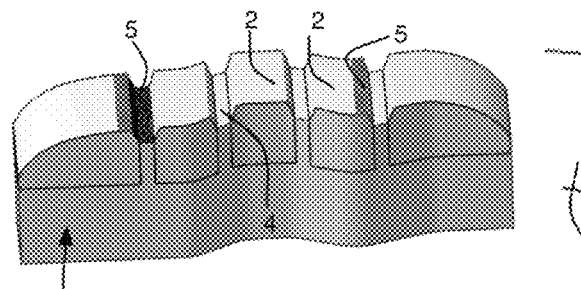
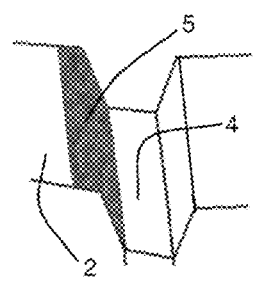
Figure 1a    Figure 1b
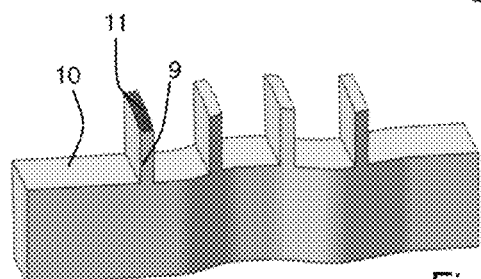
Figure 2
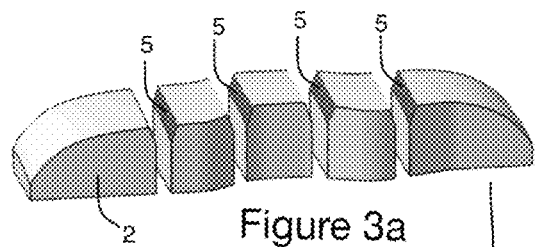
Figure 3a
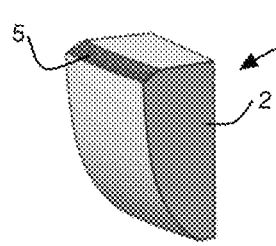
Figure 3b

TEXTURED DIE HAVING BLOCKS FOR MANUFACTURING A TEXTURED MOULD FOR MOULDING AND VULCANIZING TIRES

RELATED APPLICATIONS

This is a U.S. National Phase Application under 35 USC 371 of International Application PCT/IB2015/001213 filed on Jul. 21, 2015.

This application claims the priority of French application no. 1401753 filed Jul. 30, 2014, the entire content of which is hereby incorporated by reference.

FIELD OF THE INVENTION

The present invention relates to a die representing a tread pattern model for a tread of a tire to be moulded. It also provides a method for manufacturing a mould for moulding and vulcanizing tires.

BACKGROUND OF THE INVENTION

The document WO2010072961 describes a die for manufacturing a tire mould, said die being produced by laser sintering. By virtue of this manufacturing method, the part to be manufactured can be modelled by computer and manufactured easily on the basis of this modelling. However, the document describes a one-piece element, the design and manufacture of which have to be revised as soon as an architectural or dimensional change is made to the final product to be moulded. Moreover, the large parts manufactured by this method are relatively expensive to produce, mainly because the base materials are specific to the manufacturing method.

The application WO2010096072 relates to a cast moulding method, useful in the context of manufacturing micro-textured objects. The introduction of a plurality of micro-patterns into the surface of an object makes it possible to add certain features to the micro-textured object, for instance an increase in hydrophobicity. Some of the casting and moulding methods described in that document make it possible to arrive at the manufacture of objects that have both macro- and micro-features, for instance micro-patterns inside or on zones having macro-features. The method described therein is used exclusively on curved surfaces.

The document US20020176792 proposes a method for manufacturing a mould segment for a pneumatic tire having a tread surface made of porous metal. A model of an annular tire segment made of refractory material is formed in this mould, with segments of the tire model which are used to fashion and form each segment of the tire mould from powdered metal, and by means of the application of heat and pressure for sintering the metal as per the tire model. Blades can be mounted in the segments of the tire model in order to mould slits in the tread of the tire.

There is thus a need for a solution that makes it possible to produce dies at a lower cost, making it possible to take into account both the changes to the end product and the increasingly stringent requirements relating to the characteristics of shapes, dimensions and precision of the various zones of the dies.

The invention provides various technical means for overcoming these various disadvantages.

SUMMARY OF THE INVENTION

First of all, a first object of the invention is to provide a die representing a tread pattern model for a tread of a tire having elements with highly complex textures and/or very small dimensions with very high precision and at an attractive cost.

Another object of the invention is to provide a method for manufacturing moulds for moulding and vulcanizing tires, making it possible to obtain several moulds that each exhibit a high level of quality, at an advantageous cost.

To this end, one aspect of the invention relates to a die representing a tread pattern model for a tread of a tire to be moulded, said die being made up of a plurality of blocks separated by grooves, the grooves being formed by substantially flat surfaces, at least some of these substantially flat surfaces being provided with textures.

With such an architecture, it is possible to produce a die that bears very high precision textured surfaces, even if the textured surfaces are difficult to access. Moreover, a single die makes it possible to manufacture several moulds, making the concept particularly advantageous.

According to one advantageous embodiment, the substantially flat surfaces provided with textures are in the bottom of grooves.

According to another advantageous embodiment, the substantially flat surfaces provided with textures are on the walls of blocks.

Advantageously, the textures are arranged on tops of tread patterns.

Advantageously, the walls of blocks are bevelled.

Also advantageously, the textures comprise a plurality of recessed or protruding elements formed integrally with said die.

According to another variant embodiment, all or some of the textures are formed by cones distributed through the texture at a density at least equal to one cone per square millimeter ($mm^2$), each cone having a mean cross section of between $0.0005\ mm^2$ and $1\ mm^2$.

According to another variant embodiment, all or some of the textures are substantially mutually parallel striations, the spacing of the striations in the pattern being at most equal to 0.5 mm, each striation having a mean width of between 0.02 mm and 0.5 mm.

According to yet another embodiment, all or some of the textures form parallelepipeds having a side length of between 0.05 mm and 0.5 mm and a height of between 0.05 mm and 0.5 mm, the distance between two adjacent parallelepipeds in the texture being between 0.05 mm and 0.5 mm.

According to another embodiment, the protruding elements form strands, said strands being distributed through the pattern at a density at least equal to one strand per square millimeter ($mm^2$), each strand having a mean cross section of between $0.0005\ mm^2$ and $1\ mm^2$.

According to another variant embodiment, the protruding elements form mutually parallel blades, the spacing of the blades in the pattern being at most equal to 0.5 mm, each blade having a mean width of between 0.02 mm and 0.5 mm.

According to another embodiment, the recessed or protruding elements exhibit mutually variable shapes and distances.

According to yet another embodiment, the die is formed by clustering of a plurality of blocks.

Another aspect of the invention provides a method for manufacturing a mould for moulding and vulcanizing tires, comprising the steps of:

manufacturing a die as described above comprising at least one groove formed by substantially flat surfaces, at least some of these substantially flat surfaces being provided with textures;

manufacturing, from the die, a mould corresponding to the negative form of the tire to be moulded, made of flexible material, preferably silastene;

manufacturing, from the mould made of flexible material, a die made of brittle material, preferably plaster, corresponding to the profile of the tire to be moulded;

manufacturing, from the brittle material die, a mould corresponding to the negative form of the tire to be moulded, made of metal material, preferably aluminium;

removing the brittle material die (for example by destroying the latter), so as to release the metal mould obtained.

Advantageously, the textures of the dies are manufactured by 3D printing or laser machining, with the aid of punches, or by selective fusion of metal powder, or by electrical discharge machining.

BRIEF DESCRIPTION OF THE DRAWINGS

FIG. 1a is a perspective view of a portion of a die according to an embodiment of the invention;

FIG. 1b is an enlarged view of a textured zone of the die in FIG. 1a;

FIG. 2 is a perspective view of an example of a punch that can be used to produce the textured walls or zones of the die in FIG. 1a;

FIG. 3a shows the blocks of a die according to an embodiment of the invention in a perspective view;

FIG. 3b shows one of the blocks from FIG. 3a in an enlarged view;

DETAILED DESCRIPTION OF THE DRAWINGS

Figures 4, 5:
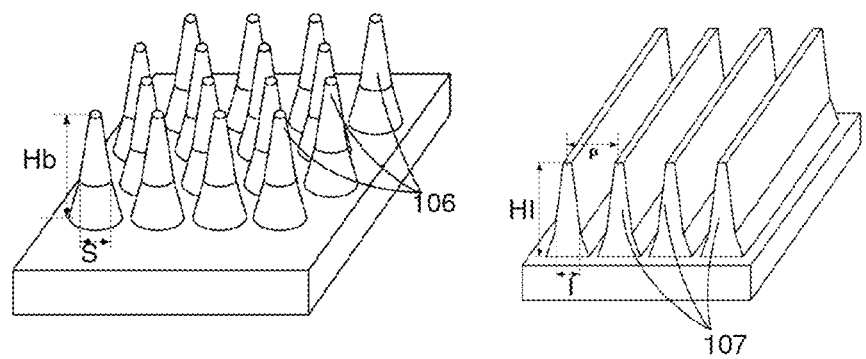
FIGS. 4 to 9 illustrate various examples of types of texture that are able to be arranged on a die according to an embodiment of the invention.

FIG. 1a illustrates an example of an embodiment of a die 1 according to the invention. More specifically, the figure illustrates a cross section through a die having a plurality of blocks 2 separated by grooves 4. The blocks 2 can correspond for example to tread pattern elements of the tire modelled by the die. The die delimits a plurality of faces which correspond to portions of the tread of the modelled tire. According to the invention, one or more of these faces are provided with textures 5, as shown for example in FIGS. 1a and 1b.

Moreover, the textures 5 can be arranged in different zones, at the groove bottom, and/or on the walls of the blocks and/or on the upper surface of the blocks. For example, the example in FIG. 1a provides textures 5 at the groove bottom, continuing over the walls of the blocks as far as the top of the blocks, covering portions of the tops of blocks. In a variant that is not illustrated, the textures continue over the entire top of at least some of the blocks.

According to the embodiments, the die 1 can be made in one piece, as illustrated in FIG. 1a, or by clustering a plurality of blocks on a support, as in the example in FIG. 3a (where the support is not illustrated in order to clearly show the blocks).

FIG. 2 illustrates an example of a punch 10 having zones or sectors comprising textures 11 opposite to those to be realized on the die. This type of punch is able to be used to realize the textures on a die as illustrated in FIG. 1a.

Depending on the parts to be manufactured, notably on the number and the position of the textures, only one or several textured zones are provided on the punch. The textured zones of the punch are advantageously provided on protruding section 9 that are specifically provided to bear the textures to be transferred to the corresponding part. However, as can be seen in FIG. 1b, some faces of the die 1 can have limited access or be difficult to access, all the same. In such cases, the shaping of the textured faces may prove tricky.

As mentioned above, FIG. 1a illustrates a perspective view of an example of a die 1 obtained by bringing together a plurality of blocks 2, FIG. 3a is a perspective view where only the blocks 2 are shown in order to clearly highlight them. FIG. 3b is an enlarged view of the right-hand block in FIG. 3a, said block being separated from the others and repositioned so that the textured zone is easily accessible. The provision of blocks 2 advantageously manufactured independently of the rest of the die makes it possible to manipulate them without restriction, in particular in order to carry out any steps relating to the addition of textures to the zones provided to this end. For example, in FIG. 3b, the textured zone 5 is easily accessible for the shaping of the textures, whether this be with the aid of a punch, by laser machining, or any other method.

It can be seen that the blocks 2 make it possible to supply walls or faces of grooves provided with very high precision textures, even if the patterns are complex and/or have relatively small dimensions. Moreover, since the textures are produced on separate elements (the blocks), it is possible to provide manufacturing conditions that are specifically tailored such that the levels of quality and precision are ensured consistently on all of the surfaces, at a particularly attractive cost. Finally, the concept makes it possible to produce, from a single die body, architectural variants in which the arrangements of textures can vary in order to create a considerable number of variants at low cost. These arrangements can provide textures of which the shapes and/or dimensions and/or distributions can vary, depending on requirements.

FIGS. 4 to 9 illustrate further examples of textures that can be disposed on a die according to the invention. FIG. 4 illustrates an embodiment in which the pattern has a plurality of strands 106. The strands 106 are distributed in the pattern at a density at least equal to one strand per $mm^2$, each strand having a mean cross section S of between 0.0005 $mm^2$ and 1 $mm^2$. It will be noted that the mean cross section of each strand corresponds to the mean of the cross sections S measured at regular intervals from the base of the strand. The strands 106 have a conical overall shape with a cross section that decreases over the height Hb of these strands.

FIG. 5 illustrates an embodiment in which the pattern has a plurality of mutually parallel blades 107, the spacing of the blades 107 in the pattern being at most equal to 0.5 mm, each blade 107 having a mean width of between 0.02 mm and 0.5 mm. It will be noted that the mean width corresponds to the mean of the widths I measured at regular intervals over the height HI of the blade, the height of each blade being between 0.05 and 0.5 mm. In another variant embodiment, the pattern has a combination of strands 106 and/or blades 107.

The invention is not limited to the examples described and shown and various modifications can be made thereto without departing from its scope. Thus, according to another non-limiting variant embodiment, the blades 107 from FIG. 5 can be discontinuous. They have a flat part between one another. They can also have cross-sectional differences between one another. In addition, the blades can have curves or angles, notably along their length. They can also have a variable length.

Figures 6, 7:
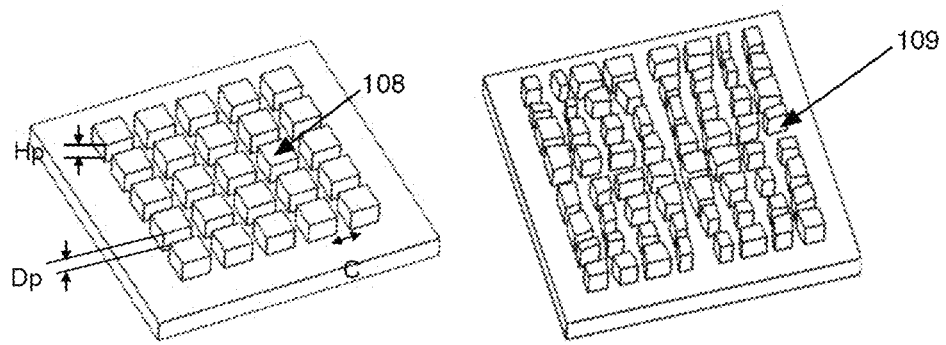

In the example in FIG. 6, the patterns have a parallelepipedal cross section 108 having a side length C of between 0.05 mm and 0.5 mm and a height Hp of between 0.05 mm and 0.5 mm, the distance Dp between two adjacent cavities in the texture being between 0.05 mm and 0.5 mm. In a variant, the cross section of the patterns can be circular or polygonal (for example hexagonal). With the square or polygonal structures, it is possible to more easily organize the elements with respect to one another so as to limit the surface area of the intermediate zones between the elements.

In the variant in FIG. 7, the elements 109 have mutually variable shapes and distances. This variant makes it possible to render the details of the texture less visible.

Figures 8, 9:
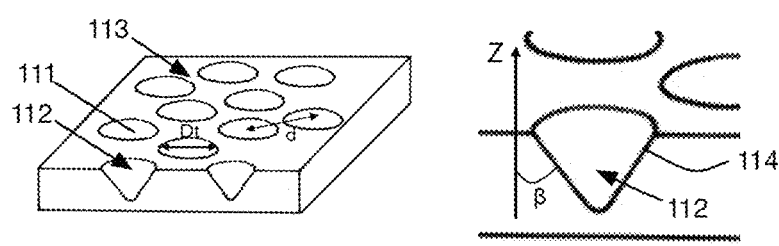

FIG. 8 illustrates the pattern according to another non-limiting variant embodiment. In this variant, the pattern is formed by a plurality of cavities 112. The cavities 112 are in this case in the form of cones which extend into the depth of the mould and open out of the mould, forming circular openings 111. The cavities 112 thus have a cross section which decreases with depth into the mould. It will be noted that, in this variant, the openings 111 of the cavities 112 are not in contact. The openings 111 are separated by intermediate zones 113. Moreover, the openings 111 are distributed regularly over the mould such that the distance d between each opening of the pattern is similar overall.

Figure 10:
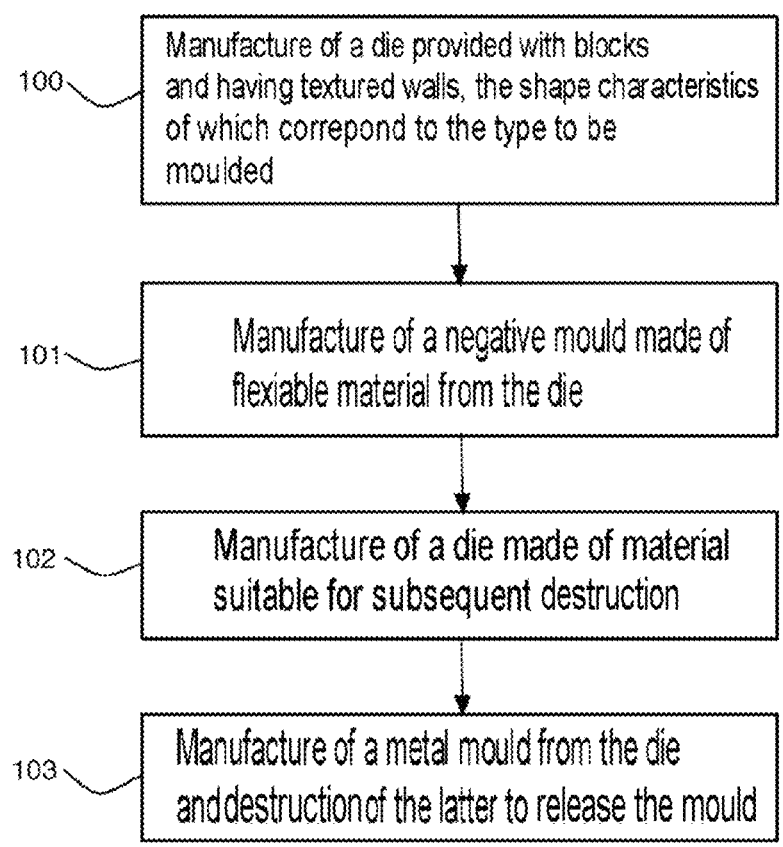
FIG. 10 shows a diagram illustrating the main steps for manufacturing a mould for moulding and vulcanizing a tire from a die according to an embodiment of the invention.

FIG. 9 is an enlarged view of the pattern in FIG. 10. In this case, all or some of the cavities have at least one wall 114 which, in cross section, forms an angle $\beta$ of between 10° and 60° with respect to a direction Z perpendicular to the pattern.

The die 1 according to the invention, the blocks 2 and in particular the shaping of the textures 5 can be realized by 3D printing, laser machining, with the aid of punches or by electrical discharge machining. Such a die has the advantage of making it possible to manufacture a plurality of moulds for moulding and vulcanizing tires. By virtue of the textured die 1 serving as a base model, the manufactured moulds are provided with textures opposite to those of the die, giving the moulded tires textures that match those of the base die, without having to provide a specific subsequent machining step for the mould or for the tires. This results in particularly advantageous ease of manufacture, and lower costs.

However, this die cannot be used directly for industrially manufacturing moulds for moulding and vulcanizing tires. This is because, since the final mould is made of metal material, i.e. non-flexible material, the initial die, which is also not flexible, cannot generally serve to produce the final mould, since the two elements combined would be difficult to separate. Therefore, provision is made, in a known manner, to provide a set of intermediate steps for passing from a rigid die to a flexible intermediate mould, and then to a die that is easy to remove once the final metal mould has been produced. These various steps are illustrated in FIG. 10.

The functional flowchart in FIG. 10 shows the main steps in the method according to the invention for manufacturing a mould for moulding and vulcanizing a tire. In step 100, first of all, a die 1 is manufactured, having blocks 2 and textured walls 5, the shape characteristics of which correspond to the tire to be moulded. The blocks 2 are advantageously manufactured separately, under conditions for shaping the textures, and then attached to the body of the die. Fastening can take place by adhesive bonding, screwing, or the like.

In step 101, a negative mould made of flexible material is produced from this die. On account of the flexibility of the material, the mould obtained can be removed easily from the die 1, which serves both as a support and as a model therefor. In step 102, another die is manufactured, this time from the mould made of flexible material obtained in step 101. Since this die is intended to be sacrificed in a subsequent step, provision is advantageously made to produce the part from inexpensive material that is easy to destroy, for example plaster. It should be noted that this die has a profile corresponding to that of the initial die 1. Once the plaster die has been obtained, this makes it possible to produce the final metal mould (step 103). The two parts, namely the metal mould and the brittle material die, are separated by breaking the die so as to release the metal mould.

In this way, a metal mould which will make it possible to faithfully reproduce the textures of the base die on the tires to be manufactured is obtained.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A die representing a tread pattern model for a tread of a tire to be moulded, said die comprising:
    a base portion having a plurality of protruding sections spaced apart from one another to define protrusion spacings therebetween, each protruding section having an end section with a flat end surface;
    a plurality of blocks each arranged in one of the protrusion spacings, or adjacent to a single one of the protruding sections, the blocks being arranged so that at least a portion of sidewalls of each block protrudes above the end section or sections of the adjacent protruding section or sections of the base portion; and
    a plurality grooves are arranged between the blocks, each groove being defined by the end section of the one of the protruding sections of the base portion, as a groove bottom, and adjacent sidewalls of the blocks arranged in the protrusion spacings on each side of the respective protruding section and protruding above the end section,
    wherein at least one of the end sections is provided with first textures, and
    wherein at least one sidewall of at least one of the blocks has a substantially flat surface provided with second textures.

2. The die according to claim 1, wherein the wherein the first textures are arranged in the bottom of the grooves.

3. The die according to claim 1, wherein the sidewalls of the blocks are bevelled and the bevelling includes the second textures.

4. The die according to claim 1, wherein at least one of the first and second textures comprises a plurality of recessed or protruding elements formed integrally with said die.

5. The die according to claim 1, wherein all or some of the first and second textures are formed by cones distributed through the texture at a density at least equal to one cone per square millimeter ($mm^2$), each said cone having a mean cross section of between 0.0005 $mm^2$ and 1 $mm^2$.

6. The die according to claim 1, wherein all or some of the first and second textures are substantially mutually parallel striations, the spacing of the striations in the pattern being at most equal to 0.5 mm, each said striation having a mean width of between 0.02 mm and 0.5 mm.

7. The die according to claim 1, wherein all or some of the first and second textures form parallelepipeds having a side length of between 0.05 mm and 0.5 mm and a height of between 0.05 mm and 0.5 mm, the distance between two adjacent parallelepipeds in the texture being between 0.05 mm and 0.5 mm.

8. The die according to claim 4, wherein the protruding elements form strands, said strands being distributed through the pattern at a density at least equal to one strand per square millimeter ($mm^2$), each said strand having a mean cross section of between 0.0005 $mm^2$ and 1 $mm^2$.

9. The die according to claim 4, wherein the protruding elements form mutually parallel blades, the spacing of the blades in the pattern being at most equal to 0.5 mm, each said blade having a mean width of between 0.02 mm and 0.5 mm.

10. The die according to claim 4, wherein the recessed or protruding elements exhibit mutually variable shapes and distances.

11. A method for manufacturing a mould for moulding and vulcanizing tires, comprising the steps of:

manufacturing a die according to claim 1;

manufacturing, from the die, a mould corresponding to the negative form of the tire to be moulded, made of flexible material;

manufacturing, from the mould made of flexible material, a die made of brittle material, corresponding to the profile of the tire to be moulded;

manufacturing, from the brittle material die, a mould corresponding to the negative form of the tire to be moulded, made of metal material; and removing the brittle material die so as to release the metal mould obtained.

12. The manufacturing method according to claim 11, wherein the textures of the dies are realized by 3D printing or laser machining, with the aid of punches, or by selective fusion of metal powder, or by electrical discharge machining.

13. The manufacturing method of claim 11, wherein said flexible material is silastene and said brittle material is plaster.

* * * * *